United States Patent [19]
Brady et al.

[11] Patent Number: 5,548,621
[45] Date of Patent: Aug. 20, 1996

[54] DATA INSTRUMENTATION SYSTEM HAVING CIRCUITRY FOR RESOLVING MULTIPLE ASYNCHRONOUS STATE INPUTS

[75] Inventors: Gary W. Brady, Aloha; David G. Ellis, Hillsboro, both of Oreg.

[73] Assignee: INTEL Corporation, Santa Clara, Calif.

[21] Appl. No.: 354,945

[22] Filed: Dec. 13, 1994

Related U.S. Application Data

[63] Continuation of Ser. No. 85,961, Jun. 30, 1993.

[51] Int. Cl.$^6$ .................................................. H04N 7/00
[52] U.S. Cl. ........................ 375/354; 375/362; 375/370; 375/224; 395/183.06
[58] Field of Search ...................... 375/354, 362, 375/371, 224, 360, 370, 377, 228; 395/182.1, 182.13, 183.06; H04L 7/00

[56] References Cited

U.S. PATENT DOCUMENTS

| | | | |
|---|---|---|---|
| 4,779,089 | 10/1988 | Theus | 340/825.5 |
| 5,055,637 | 10/1991 | Hagner | 174/260 |
| 5,373,535 | 12/1994 | Ellis et al. | 375/371 |
| 5,392,318 | 2/1995 | Ellis et al. | 375/371 |
| 5,410,664 | 4/1995 | Brooks et al. | 395/400 |
| 5,416,807 | 3/1995 | Brady et al. | 375/356 |
| 5,436,927 | 7/1995 | Brady et al. | 375/224 |

*Primary Examiner*—Kim Yen Vu
*Assistant Examiner*—Madeleine Anh-Vinh Nguyen
*Attorney, Agent, or Firm*—Blakely, Sokoloff, Taylor & Zafman

[57] ABSTRACT

A number of detection circuits, one for each source of control signal set inputs, and a high speed resolution circuit, are provided for resolving multiple control signal inputs into a single stable, predictable, and useful output signal. The detection circuits detect active control signals in the various control signal set inputs, and generate detected signals. The high speed state resolution circuit generates an output signal, conditionally changing the output state based on the detected signals and the current state being output. When deciding whether to change the output state, the high speed resolution circuit considers only the detected signals applicable to the current output state and responds accordingly, ignoring all other detected signals that are not applicable. The detection circuits and the resolution circuit are coordinated in timings, ensuring proper resolution.

2 Claims, 6 Drawing Sheets

५,५४८,६२१

DATA INSTRUMENTATION SYSTEM HAVING CIRCUITRY FOR RESOLVING MULTIPLE ASYNCHRONOUS STATE INPUTS

This is a continuation of application Ser. No. 08/086,961, filed Jun. 30, 1993.

BACKGROUND OF THE INVENTION

1. Field of the Invention

The present invention relates to the field of digital systems, in particular, digital systems having multiple state machines. More specifically, the present invention relates to a method and apparatus for resolving multiple asynchronous control signals to a stable, predictable, and useful output signal.

2. Background

In a number of digital applications, it is often necessary to resolve multiple asynchronous control signals. For example, in a data instrumentation system comprising a number of trace boards for monitoring, acquiring data and controlling a number of emulation processors operating at different speeds, it is desirable to have a signal that can be controlled by each state machine on the trace boards, and can also be sampled by the state machines. To do so, it is necessary to resolve the asynchronous control signals originating from each state machine to create this signal. Traditional prior art methods for resolving asynchronous signals typically involve synchronizing the input signals to a common clock first. Synchronizing the control signals to a predetermined common clock has the disadvantage of having a delay cost of at least two clocks for the synchronization logic. In a digital system such as a data instrumentation system where a number of data values are being acquired, this delay can represent a large lag in information from the original event that created the control signals. Additionally, to guarantee detection of all control signals, the predetermined common clock should be at least twice as fast as the fastest control signal. This places a very difficult performance requirement on the circuit and effectively limits the top operating speed. Thus, it is desirable to be able to resolve asynchronous control signals to a stable, predictable, and useful output signal without having to first synchronize all the control signals to a common clock. As will be disclosed, the present invention provides such a method and apparatus, which advantageously achieves the desirable results. As will be obvious from the descriptions to follow, the present invention has particular application to high speed data instrumentation systems.

SUMMARY OF THE INVENTION

Under the present invention, the desirable results are advantageously achieved by providing a number of control signal detection circuits, one for each source of a control signal input set, and a high speed resolution circuit. Each control signal input set comprises two control signals, SET_in and CLR_in. The control signal detection circuits are used to detect the presence of active SET_in$_s$ and active CLR_in$_s$ in the input sets, and in response generate active control signal detected signals, SET_det$_s$ and CLR_det$_s$ for the resolution circuit. The resolution circuit is used to generate an output signal, RSLVD_out, with two possible output states, ON and OFF, correctly changing the output state from ON to OFF or from OFF to ON, based on the received SET_det$_s$ and CLR_det$_s$ signals and the current state being output. i.e. ON or OFF. When deciding whether to change the output state from ON to OFF, the resolution circuit considers only the CLR_det$_s$ signals, ignoring the SET_det$_s$ signals, whereas when deciding whether to change the output state from OFF to ON, the resolution circuit considers only the SET_det$_s$ signals, ignoring the CLR_det$_s$ signals. Additionally, after changing the output state from ON to OFF or from OFF to ON, the resolution circuit waits until the change triggering CLR_det$_s$ or SET_det$_s$ signals have all been deasserted before considering the SET_det$_s$ or CLR_det$_s$.

The durations of the SET_det$_s$ and CLR_det$_s$ signals are coordinated with the operating speed of the resolution circuit. More specifically, the detection circuits maintain the SET_det$_s$ and CLR_det$_s$ signals for sufficiently long durations to ensure the resolution circuit will have enough time to respond to the detected SET_det$_s$ and CLR_det$_s$ signals. In the presently preferred embodiment, the detection circuits are flip-flop based, The SET_det$_s$ and CLR_det$_s$ signals are generated by setting the flip flops using active SET_in$_s$ and CLR_in$_s$ signals. The timing coordinations between the detection circuits and the resolution circuit are achieved by clearing the flip flops using two common feedback signals, SET_sum_fb and CLR_sum_fb. The SET_sum_fb and CLR_sum_fb signals are generated by the resolution circuit by summing the received SET_det and CLR_det signals.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
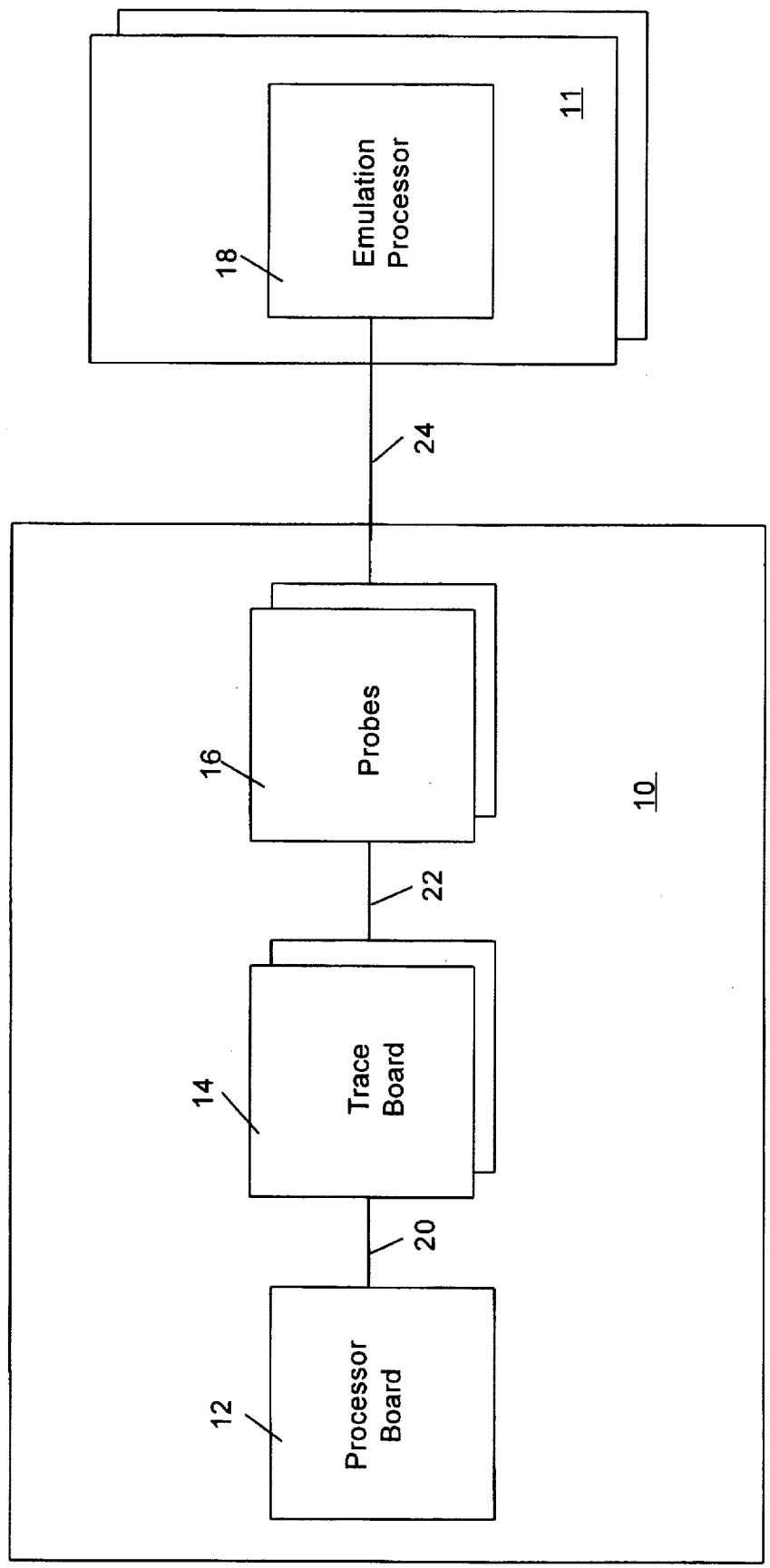
FIG. 1 illustrates an exemplary high speed data instrumentation system incorporating the teachings of the present invention.

Referring now to FIG. 1, a block diagram illustrating an exemplary data instrumentation system incorporating the teachings of the present invention is shown. Shown is an exemplary data instrumentation system 10 incorporating the teachings of the present invention coupled to a number of target systems 11 for monitoring, acquiring data, and controlling the target systems 11. The exemplary data instrumentation system 10 comprises a processor board 12 and a number of trace boards 14, incorporated with the teachings of the present invention. The exemplary data instrumentation system 10 further comprises a number of probes 16. The target systems 11 comprise a number of emulation processors 18 operating at different speeds. The processor board 12 is coupled to the trace boards 14, for example, through a parallel bus 20. The trace boards 14 are coupled to the probes 16, for example, through a number of parallel cables 22. The probes 16 are in turn coupled to the emulation processors 18.

The relevant portions of the processor board 12 and the trace boards 14 will be described below in further detail with additional references to the remaining figures. Otherwise, the processor board 12, the probes 16, and the emulation processors 18 are intended to represent a broad category of these elements found in many data instrumentation and target systems. Their constitutions and functions are well known and will not be further described. Similarly, the trace boards 12 are intended to represent a broad category of trace boards, including but not limited to the trace board described in copending U.S. patent applications, Ser. No. 08/040,902, entitled Method and Apparatus For Resynchronizing Data Slices With Variable Skews, and Ser. No. 08/040,901, entitled Method and Apparatus For Synchronizing Periodic Sync Pulse Generations By A Number Of Remote High Speed Circuits, both assigned to assignee of the present invention, which are hereby fully incorporated by reference. Their constitutions and functions will not be further described. While the present invention is being described with a data instrumentation system, based on the description to follow, it will be appreciated that the present invention may be practiced with other digital systems, such as a microprocessor based computer system.

Figure 2:
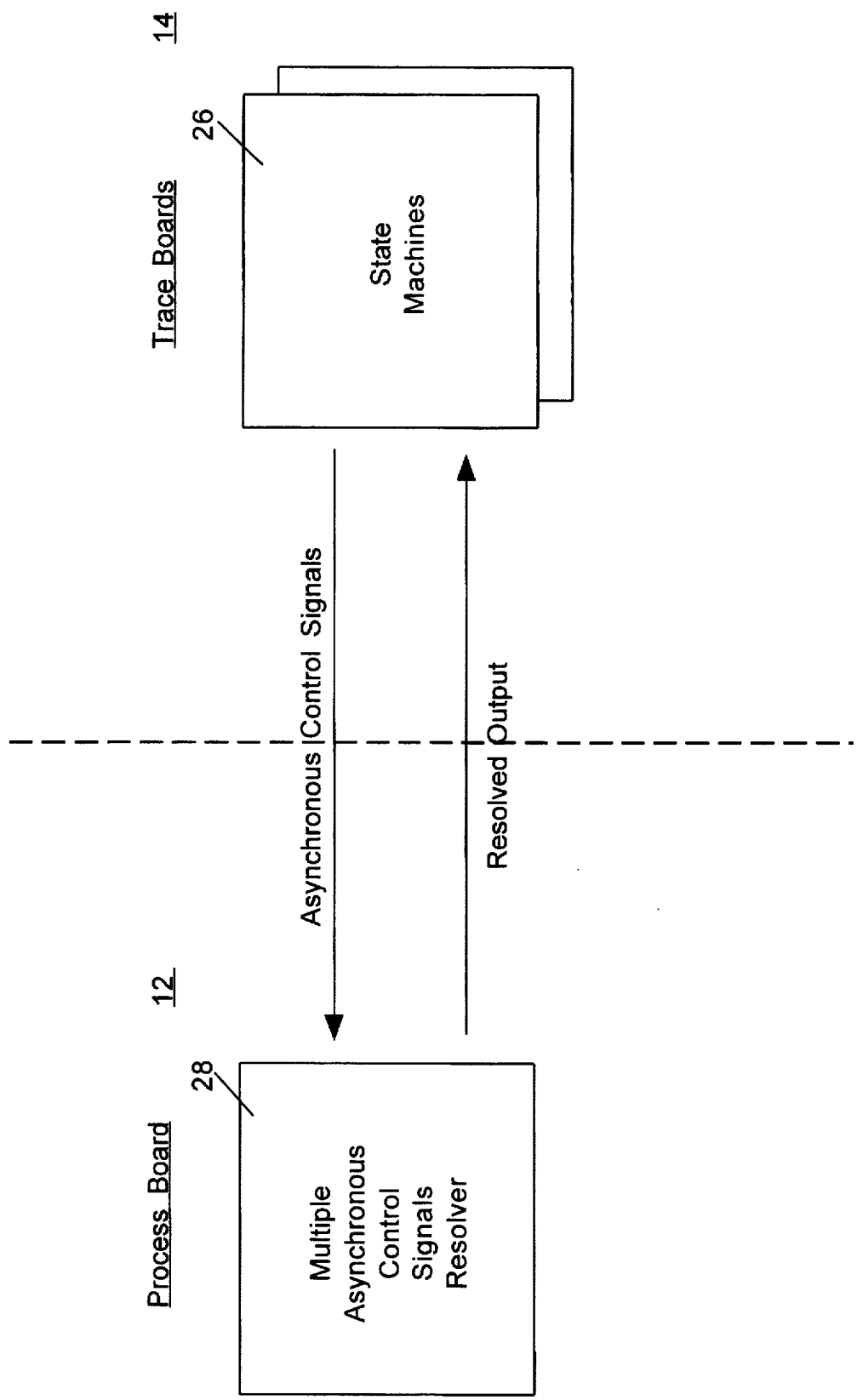
FIG. 2 illustrates the relevant portions of the processor and trace boards of FIG. 1 in further detail.

Referring now to FIG. 2, a block diagram illustrating the relevant portions of the processor and trace boards of FIG. 1 in further detail is shown. The trace boards 14 comprise a number of state machines 26 asynchronously generating a number of control signal sets. Each state machine 26 generates one or more set of control signals. The processor board 12 comprises the multiple asynchronous control signals resolver 28 of the present invention resolving the asynchronous control signals, and generating a stable, predictable, and useful output signal for the state machines 26. The multiple asynchronous control signals resolver 28 will be described in further detail with additional references to the remaining figures. The state machines 26 are intended to represent a broad category of state machines found in digital systems. Their constitutions and functions are well known and will not be further described. While the present invention is being described with the multiple asynchronous control signals resolver being disposed on the processor board. It will be appreciated that the present invention may be practiced with the multiple asynchronous control signals resolver being disposed in other convenient locations of the data instrumentation system.

Figure 3:
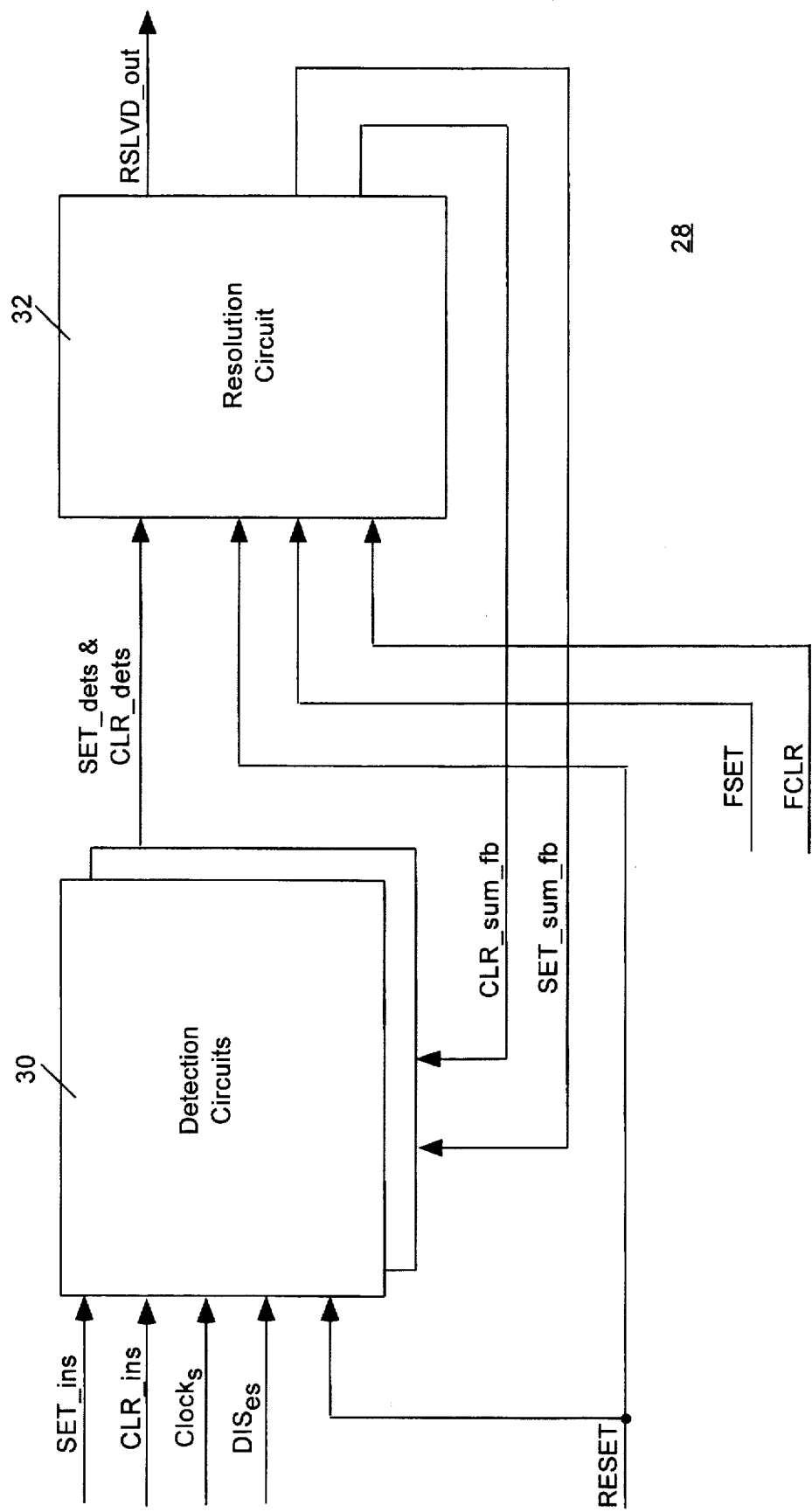
FIG. 3 illustrates the multiple asynchronous control signals resolver of the present invention in further detail.

Referring now to FIG. 3, a block diagram illustrating the multiple asynchronous control signals resolver of the present invention in further detail is shown. The multiple asynchronous control signals resolver 28 of the present invention comprises a number of identical control signal detection circuits 30, one for each source of a control signals set, and a high speed resolution circuit 32 coupled to the detection circuits 30. Each control signal set comprises two control signals (SET_in and CLR_in). The control signal detection circuits 30 are used to detect the presence of active SET_in$_s$ and active CLR_in$_s$ in the input sets, and in response generate active control signal detected signals, SET_det$_s$ and CLR_det$_s$ for the resolution circuit 32. The resolution circuit 32 is used to generate an output signal, RSLVD_out, with two possible output states, ON and OFF, correctly changing the output state from ON to OFF or from OFF to ON, based on the received SET_det$_s$ and CLR_det$_s$ signals and the current state being output, i.e. ON or OFF. When deciding whether to change the output state from ON to OFF, the resolution circuit 32 considers only the CLR_det$_s$ signals, ignoring the SET_det$_s$ signals, whereas when deciding whether to change the output state from OFF to ON, the resolution circuit 32 considers only the SET_det$_s$ signals, ignoring the CLR_det$_s$ signals. Additionally, after changing the output state from ON to OFF or from OFF to ON, the resolution circuit 32 waits until the change triggering CLR_det$_s$ or SET_det$_s$ signals have all been deasserted before considering the SET_det$_s$ or CLR_det$_s$.

The durations of the SET_det$_s$ and CLR_det$_s$ signals are coordinated with the operating speed of the resolution circuit 32. More specifically, the detection circuits 30 maintain the SET_det$_s$ and CLR_det$_s$ signals for sufficiently long durations to ensure the resolution circuit 32 will have enough time to respond to the detected SET_det$_s$ and CLR_det$_s$ signals. In the presently preferred embodiment, the detection circuits 30 are flip-flop based. The SET_det$_s$ and CLR_det$_s$ signals are generated by setting the flip flops using active SET_in$_s$ and CLR_in$_s$ signals. The timing coordinations between the detection circuits 30 and the resolution circuit 32 are achieved by clearing the flip flops using two common feedback signals, SET_sum_fb and CLR_sum_fb. The SET_sum_fb and CLR_sum_fb signals are generated by the resolution circuit 32 by summing the received SET_det and CLR_det signals.

Figure 4:
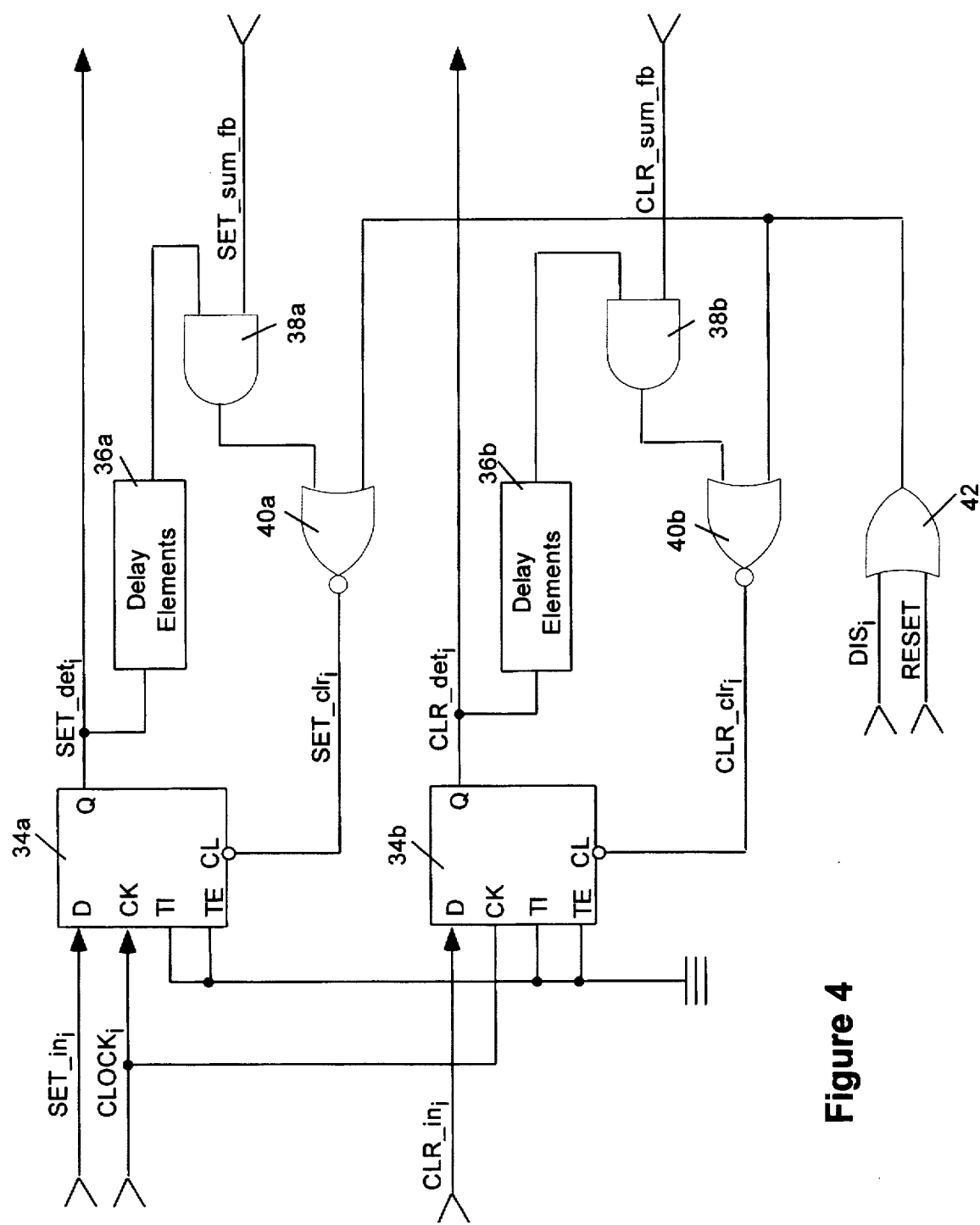
FIG. 4 illustrates the detection circuit of the present invention in further detail.

Referring now to FIG. 4, a block diagram illustrating the detection circuit of the present invention in further detail is shown. The detection circuit 30* comprises two rising edge flip flops 34a–34b, two series of delay elements 36a 36b, two AND gates 38a–38b, and two NOR gates 40a–40b, serially coupled to each other in two circular loops. The AND gates 38a–38b are also coupled to the resolution circuit. Additionally, the detection circuit 30* further comprises an OR gate 42 coupled to the NOR gates 40a–40b. The flip flops 34a–34b are used to detect active SET_in and CLR_in control signals and generate SET_det and CLR_det signals respectively. The AND gates 38a–38b and the NOR gates 40a–40b, in conjunction with delay elements 36a–36b, the resolution circuit, and the OR gate 42, are used to reset the flip flops 34a–34b.

Each flip flop 34a or 34b receives either the SET_in or the CLR_in signal at its D input, and in response, generates an active Q output (SET_det or CLR_det) whenever an active input is detected at its D input at a rising edge of a clock pulse (and active low is not asserted at CL). Note that the clock inputs to the flip flops 34a and 34b of the various detection circuits 30* are not synchronized. Each series of delay elements 36a or 36b receives either an active SET_det or CLR_det as input and applying sufficient amount of delay to the SET_det or CLR_det signals to ensure the flip flop's CLK to CLR time is maintained. Each AND gate 38a or 38b receives either the delayed SET_det or CLR_det, and either a SET_sum_fb or a CLR_sum_fb signal from the resolution circuit as inputs, and outputs the logical AND of the received inputs. The SET_sum_fb and CLR_sum_fb signals ensure the SET_det and CLR_det signals are maintained for durations sufficiently long for the resolution circuit to respond to them. The SET_sum_fb and CLR_sum_fb signals will be described in further detail below.

Each NOR gate 40a or 40b receives one of the logical AND outputs as input, and generates an active low for the CL input of one of the flip flops 34a–34b, whenever the input equals logic one. Each NOR gate 40a or 40b also receives the logical OR output of the OR gate 42, which is generated based on the values of a DIS and a RESET signal. The DIS signal forcibly resets the flip flops 34a–34b of the particular detection circuit 30*, whereas the RESET signal forcibly resets the flip flops 34a–34b of all detection circuits 30.

Figure 5:
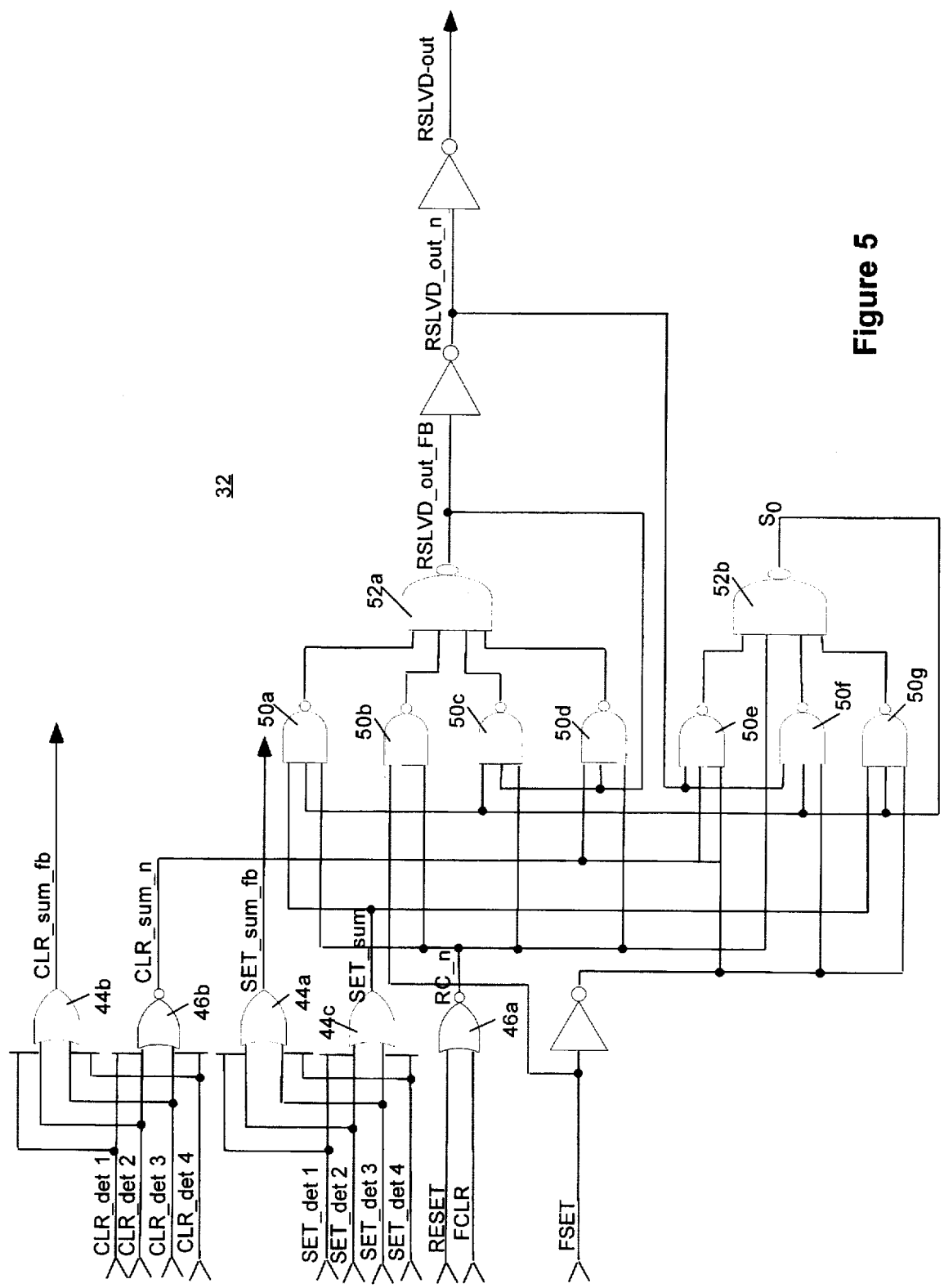
FIGS. 5 and 6 illustrate the resolution circuit of the present invention in further detail.
Figure 6:
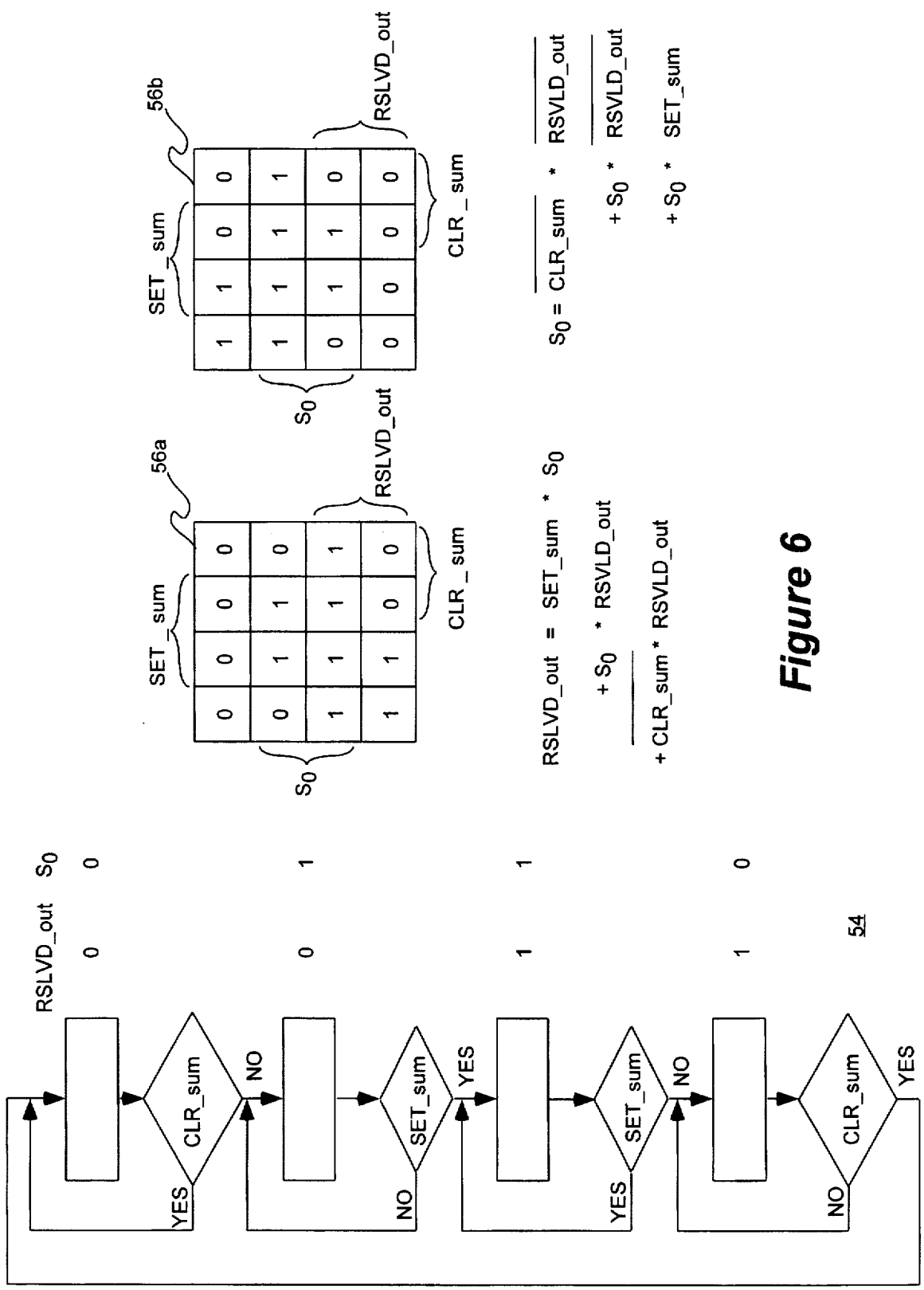

Referring now to FIGS. 5–6, two diagrams illustrating the resolution circuit of the present invention in further detail are shown. The resolution circuit 32 comprises three OR gates 44a–44c, two NOR gates 46a–46b and, and two stages of NAND gates 50a–50g and 52a–52b. The first stage of NAND gates comprises seven NAND gates 50a–50g, whereas the second stage of NAND gates comprises two NAND gates 52a–52b. The second NOR gate 46b and the third OR gate 44c are coupled to the two stages of NAND gates 50a 50g and 52a–52b. The first and second OR gates 44a–44b are used to generate the SET_sum_fb and CLR_sum_fb signals, as a way to allow the detection circuits to determine they have maintained the SET_det and CLR_det signals sufficiently long for the resolution circuit 32 to respond to them. The third OR gate 44c and the second NOR gate 46b are used to generate the consolidated SET detection signals (SET_sum) and the complement of the consolidated CLR detection signal (CLR_sum_n) for the first stage of NAND gates 50a respectively. The first NOR gate 46a is used to force set the first and second stage of NAND gates 50a–50g and 52a–52b. The two stages of NAND gates 50a 50g and 52a–52b are used to generate the stable, predictable, and useful output signal RSLVD_out, with two possible output states, ON (logic one) and OFF (logic zero).

Each OR gate 44a, 44b or 44c or the second NOR gate 46b receives either the SET_det or the CLR_det signals from the detection circuits as inputs, and generates the logical OR or the logical NOR of its inputs (SET_sum_fb, CLR_sum_fb, SET_sum, and CLR_sum_n). The first NOR gate 46a receives a RESET and a FCLR signal as inputs, and generates the logical NOR of its inputs (RC—n). The RESET. FCLR and the FSET signals are used to force set the first and second stage of NAND gates 50a–50g and 52a–52b. The RESET, FCLR, and FSET signals will be described in further detail later. The first stage of NAND gates 50a–50g receives, SET_sum, CLR_sum_n, RC—n and FSET as inputs, and in conjunction with the second stage of NAND gates 52a–52b, generate RSLVD_out. The manner in which the two stages of NAND gates 50a–50g and 52a–52b generate RSLVD_out will be discussed in further detail below. While the present invention is being described with the OR gates 44a–44c, and the second NOR gate 46b receiving SET_in and CLR_in signals from four detection circuits, it will be appreciated that the present invention may be practiced with more or less detection circuits.

The state flow diagram and the two Karnaugh maps in FIG. 6 illustrate in further detail the manner in which the two stages of NAND gates 50a–50g and 52a–52b generate RSLVD_out. The two stages of NAND gates have four states governed by the values of the signals RSLVD_out and S0, i.e. {0, 0}, {0, 1}, {1, 1}, and {1, 0}. The values of RSLVD_out and S0 are determined based on the two boolean equations shown, i.e.

$$RSLVD\_out = SET\_sum * S0 + S0 * RSLVD\_out +$$

$$<CLR\_sum> * RSLVD\_out$$

$$S0 = <CLR\_sum> * <RSLVD\_out> +$$

$$S0 * <RSLVD\_out> + S0 * SET\_sum$$

where <CLR_sum>denotes the complement of CLR_sum, and

<RSLVD_out>denotes the complement of RSLVD_out.

Note that <CLR_sum>is the same as CLR_sum_n.

The two Karnaugh maps shown 56a–56b are alternative expressions of the two boolean equations.

Thus, at state {0, 0}, RSLVD_out will remain equal to 0 (OFF), whereas since S0=<CLR_sum>, S0 will remain equal to 0 until CLR_sum becomes inactive. In other words, the two stages of NAND gates enter state {0, 1}, from state {0, 0}when CLR_sum becomes inactive. At state {0, 1}, S0 will remain equal to 1, whereas since RSLVD_out=SET_sum, RSLVD_out will remain equal to 0 (OFF) until SET_sum becomes active. In other words, the two stages of NAND gates enter state {1, 1}from state {0, 1}when SET_sum becomes active. At state {1, 1}. RSLVD_out will remain equal to 1 (ON), whereas since S0=SET_sum, S0 will remain equal to 1 until SET_sum becomes inactive. In other words, the two stages of NAND gates enter state {1, 0}from state {1, 1}when SET_sum becomes inactive. At state {1, 0}, S0 will remain equal to 0, whereas since RSLVD_out=<CLR_sum>, RSLVD_out will remain equal to 1 (ON) until CLR_sum becomes active. In other words, the two stages of NAND gates enter state {0, 0}from state {1, 0}when CLR_sum becomes active.

Therefore, the two stages of NAND gates effectively consider only the SET_det signals when RSLVD_out is OFF, and consider only the CLR_det signals when RSLVD_out is ON. Additionally, upon changing the output state to OFF, the two stages of NAND gates wait until the triggering CLR_det signals have all been deasserted before considering the SET_det signals, and upon changing the output state to ON, the two stages of NAND gates wait until the triggering SET_det signals have all been deasserted before considering the CLR_det signals.

Lastly, the RESET and FCLR signals described earlier are used to force the two stages of NAND gates into state {0, 1}, whereas the FSET signal described earlier is used to force the two stages of NAND gates into state {1, 0}. In this embodiment, the RESET and FCLR signals take precedence over the FSET signal.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A data instrumentation system comprising:

a) a plurality of trace boards having a plurality of state machines for asynchronously generating a plurality of control signal sets, each of said plurality of control signal sets having two control signals;

b) a plurality of detection circuits coupled to said state machines for receiving said plurality of control signal sets, detecting active control signals in said received plurality of control signal sets, and generating a plurality of detection signal sets, each of said plurality of detection signal sets having two detection signals corresponding to the two control signals of one of said plurality of control signal sets, each of said plurality of detection signal sets being used for identifying active control signals being detected in the corresponding control signal set; and c) a resolution circuit coupled to said detection circuits and said state machines for receiving said plurality of detection signal sets, and generating an output signal having two possible output states, said output signal being generated based on a current state of said output signal and selected ones of said received detection signals that are applicable to the current state of said output signal.

2. The data instrumentation system as set forth in claim 1, wherein, said detection circuits further receive a common feedback signal set from said resolution circuit, said common feedback signal set having two feedback signals, one feedback signal for each control signal in a control signal set;

said detection circuits further base said generation of said plurality of detection signal sets on said common feedback signal set.

* * * * *

UNITED STATES PATENT AND TRADEMARK OFFICE
CERTIFICATE OF CORRECTION

PATENT NO. : 5,548,621
DATED : August 20, 1996
INVENTOR(S) : Brady et al.

It is certified that error appears in the above-identified patent and that said Letters Patent is hereby corrected as shown below:

In column 5 at line 31 delete "50a" and insert --50a-50g--

In column 5 at line 50 delete "RC--n" and insert --RC__n--

In column 5 at line 67 delete "S0" and insert --SO--

In column 6 at line 21 delete "S0" and insert --SO--

In column 6 at line 27 delete "S0" and insert --SO--

Signed and Sealed this

Tenth Day of December, 1996

Attest:

Attesting Officer

BRUCE LEHMAN
*Commissioner of Patents and Trademarks*